Patented Sept. 5, 1944

2,357,469

UNITED STATES PATENT OFFICE 2,357,469

ISOLATION OF WATER INSOLUBLE CELLULOSE HYDROXY FATTY ACIDS AND THEIR WATER SOLUBLE SALTS

Albert Aubrey Houghton, Saltcoats, and Kenneth J. C. Luckhurst, Glasgow, Scotland, assignors to Imperial Chemical Industries Limited, a corporation of Great Britain No Drawing. Application November 14, 1941, Serial No. 419,170. In Great Britain December 20, 1940

7 Claims. (Cl. 260—232)

The present invention relates to the preparation of water soluble salts of water insoluble cellulose hydroxy fatty acids and the corresponding cellulose hydroxy fatty acids, from fibrous reaction mixtures resulting from the etherification reaction between the cellulose and a salt of a halogenated fatty acid in the presence of aqueous or partly aqueous alkali metal hydroxide solution; for instance the hot and cold water soluble sodium cellulose glycollate and the water insoluble cellulose glycollic acid obtained from the reaction between cellulose, sodium chloracetate, and aqueous or aqueous alcoholic sodium hydroxide. The invention is applicable to the preparation not only of the salts corresponding to the metallic ions present in the reaction mixture, but also of other water soluble salts of the water insoluble cellulose hydroxy fatty acids.

Water soluble salts of cellulose hydroxy fatty acids insoluble in water are characterised by solubility in water at all temperatures up to the boiling point, which renders them particularly useful for many purposes, but the removal of the other water soluble electrolytes present in the etherification reaction mixture, which in practice is always alkaline and contains undesired salts at the end of the reaction, is a problem which presents considerable difficulty or inconvenience. It has been suggested to wash the reaction mixture exhaustively with aqueous alcohol, but the removal of the electrolytes by this method is highly inefficient. They can be removed by the inconvenient method of dialysing the reaction mixture, and from the resulting purified aqueous solution of the alkali metal salt of the cellulose hydroxy fatty acid the purified salt may be recovered by precipitation with alcohol or the like, but when it is dried off, the salt is obtained in a pulverulent amorphous condition, which does not facilitate the rapid preparation of its aqueous solutions. This method moreover necessitates a large consumption of the organic solvent since precipitation will only occur when the concentration of the solution is about 45 per cent in the case of alcohol or 40 per cent. in the case of acetone.

Although the corresponding cellulose hydroxy fatty acid is insoluble in water and can be precipitated from the aqueous solutions of its salts when these are rather strongly acidified, the precipitate obtained is of a mucilaginous or gelatinous nature which renders it very inconvenient or difficult to handle. It may contain from 95 to 99½ per cent. water. While by the addition of sufficient alcohol to the precipitate it can be converted into a pulverulent amorphous solid condition the high alcoholic concentration required to maintain this condition makes this method of isolation expensive, and is inimical to the removal of any undesired salts that may be present in addition to the cellulose hydroxy fatty acid. Moreover, whether or not such salts are present, the dry cellulose hydroxy fatty acid is not obtained in a readily dissolvoble condition facilitating the rapid preparation of solutions of its water soluble salts.

It is an object of the present invention to provide an improved process for preparing water soluble salts of cellulose hydroxy fatty acids insoluble in water, and the said cellulose hydroxy fatty acids, whereby the undesired electrolytes resulting from the method of their manufacture may be more conveniently or economically removed. Another object of the invention is to provide a process whereby the resulting purified cellulose hydroxy fatty acids or salts thereof may be obtained in a form that facilitates the rapid preparation of their solutions in appropriate aqueous media. It is a further object of the invention to provide preparations of salts of water insoluble cellulose hydroxy fatty acids which dissolve in water yielding solutions of predetermined pH. Other objects of the invention will appear hereinafter.

We have made the remarkable discovery that when an alkaline etherification reaction mixture containing a water soluble alkali metal salt of a water insoluble cellulose hydroxy fatty acid in a fibrous condition is mixed with excess of an acid adapted to liberate the cellulose hydroxy fatty acid provided the liberating acid is employed in such concentration and amount that the fibrous condition of the cellulose ether is retained throughout its addition, if desired with the assistance of an on-solvent water miscible organic liquid, then the fibrous condition of the resulting cellulose hydroxy fatty acid is maintained if the mixture is thereafter highly diluted with water. The fibrous cellulose hydroxy fatty acid may accordingly be purified from the undesired soluble salts and excess of the liberating acid by extraction with water, and thus in a most advantageous manner. We have found, moreover, that the fibrous form of the purified cellulose hydroxy fatty acid facilitates the preparation of aqueous solutions of its salts.

We have further found that when the so purified fibrous cellulose hydroxy fatty acid is converted into its salts without losing its fibrous form at any stage throughout such conversion, for instance into its sodium potassium, ammonium, lithium or magnesium salt, these may be prepared in a form facilitating their rapid solution in water. This is achieved by mixing with the fibrous cellulose hydroxy fatty acid the appropriate base or a salt of a volatile acid which can be liberated by the cellulose hydroxy fatty acid, in the presence of a medium containing a sufficient proportion of a volatile organic water miscible liquid, which is not a solvent for the cellulose ether. We have also found that by controlling the extent of the conversion of the fibrous cellulose hydroxy fatty acid into its salts in the presence of the volatile organic water miscible liquid, preparations may be made which dissolve in water to form solutions of predetermined pH.

According to one feature of the present invention, therefore, in the preparation of water soluble salts of water insoluble cellulose hydroxy fatty acids, and of the said acids, an excess of an acid adapted to liberate the cellulose hydroxy fatty acid is mixed with an etherification reaction mixture containing an alkali metal salt of the cellulose hydroxy fatty acid in fibrous form, the concentration and amount of the liberating acid employed being such that the fibrous condition of the cellulose ether is retained throughout its addition, if desired with the assistance of a non-solvent water miscible organic liquid, and the resulting fibrous cellulose hydroxy fatty acid is thereafter purified by extraction with water.

According to a further feature of the invention the purified fibrous cellulose hydroxy fatty acid is converted into a water soluble salt thereof by admixture therewith of a base or a salt of a volatile acid which can be displaced by the cellulose hydroxy fatty acid ether in the presence of a medium containing a sufficient proportion of a volatile organic water miscible liquid that is not a solvent for the cellulose ether to maintain it in fibrous condition throughout such conversion.

According to a still further feature of the invention the extent to which the purified fibrous cellulose hydroxy fatty acid is converted into a water soluble salt thereof in the presence of a medium containing a sufficient proportion of a volatile organic water miscible liquid that is not a solvent for the cellulose ether to maintain it in fibrous condition throughout the conversion is controlled whereby the resulting preparations when dried off and dissolved in water yield solutions of predetermined pH.

According to one particular embodiment of the aforementioned feature of the invention, in converting the purified cellulose hydroxy fatty acid into a water soluble salt thereof in the presence of the said volatile organic nonsolvent medium, there is introduced a quantity of a base more than sufficient to convert the whole of the cellulose ether into a salt of the cellulose hydroxy fatty acid, and the excess of the base is thereafter converted into a salt of another acid before evaporation of the voltaile organic medium.

The composition of the etherification mixture employed in the etherification of the cellulose must be such that the alkali metal salt of the water insoluble cellulose hydroxy fatty acid is obtained in fibrous condition. To this end the composition of the mixture of ingredients employed for the etherification reaction should be chosen so as to minimise the swelling of the resulting alkali metal salt of the cellulose hydroxy fatty acid, and there are various ways in which this may be done. Thus there may be included in the reaction mixture salts such as alkali metal chlorides; or anhydrous salts capable of combining with water, for instance sodium carbonate or sodium sulphate; or water miscible organic liquids which are not solvents for the cellulose ether, such as ethyl alcohol or acetone. For a number of reasons it is preferred to employ water miscible organic non-solvents for this purpose. Thus, it is possible by their employment to minimise the water content of the etherification mixture and thereby minimise the consumption of the salt of halogenated fatty acid required to attain a water soluble cellulose ether without at the same time inconveniently reducing the amount of fluid associated with the cellulose. Moreover, the anti-swelling effect that can be obtained from saline substances is limited by their solubility, which is considerably reduced by the free alkalinity of the water in the reaction mixture after the etherification has taken place, a difficulty which does not arise in the case of such water miscible organic liquids as ethyl alcohol and acetone. If desired the composition of the still unacidified reaction mixture may be adjusted or further adjusted so as to minimise the swelling of the alkali metal salt of the cellulose hydroxy fatty acid, but as a rule it is preferable to include water miscible organic liquids that are non-solvent for the cellulose ether in the composition of the reaction mixture than to add them after the etherification has taken place.

In putting our invention into effect the minimum amount of the acid required wholly to convert the fibrous sodium salt of the cellulose hydroxy fatty acid into the cellulose hydroxy fatty acid can always be determined by diluting test portions of the mixture acidified with increasing quantities of acid and observing the variation of the viscosity of solutions of like concentration or the electrometrically determined pH, since the viscosity of the liquid falls from a maximum value observed at about pH6 to a steady value attained when the whole of the salt has been converted into cellulose hydroxy fatty acid, usually at a pH of about 2.5. In practice the appearance and consistency of the acidified reaction mixture will serve to reveal to the careful observer whether sufficient acid has been employed, or if desired, the acidified reaction mixture may be tested regularly with a colour indicator to ensure that the amount of acid employed is sufficient to give a predetermined colour response indicating an acidity known to be sufficient for the required conversion.

In putting the invention into effect, however, it is not enough merely to add a sufficient quantity of the liberating acid to the reaction mixture to effect complete conversion of the alkali metal salt into the cellulose hydroxy fatty acid; it is also necessary to employ acid in a suitable concentration. If the liberating acid were used in too dilute aqueous solution the water introduced into the mixture would swell the fibrous material at some stage of the acidification sufficiently to cause it to lose its fibrous condition. This can always be prevented by the employment of the liberating acid in undiluted or highly concentrated form. On the other hand certain acids, notably sulphuric acid, when used in undiluted form or highly concentrated aqueous solution and in excessive amount exert a swelling action on the cellulose hydroxy fatty acid, which may also cause a loss of the fibrous form of the product. While successful results can be obtained even with undiluted acid, it is preferred to employ only moderately concentrated aqueous solutions of the acid since they are less difficult to mix into the material without causing excessive local concentrations and consequent loss of fibrous form, and since they permit of a greater variation in the amount of the acid that can be introduced into the reaction mixture. It is desirable that the fibrous cellulose hydroxy fatty acid, when diluted with water and squeezed out, should tend to form friable crumbly cakes rather than masses of soft consistency and translucent appearance of higher water content. It is a remarkable fact that the effect on the water absorbency of the cellulose either caused by swelling is apparently irreversible. Thus if it is allowed to swell excessively or lose its fibrous form before or during the acidification it is useless to add to the system thereafter such materials as would have prevented the formation of a cellulose hydroxy fatty acid of undue water absorbency or one of gelatinous or mucilaginous form, if they had been present before the acidification. Moreover if it is found that the composition of any particular etherification mixture is such that difficulty is obtained in securing a fibrous cellulose hydroxy fatty acid of desirably low water absorbency from it, even by the use of acids of high concentration, so that it becomes necessary to alter the ratio of the amount of water to ingredients tending to prevent swelling of the water soluble alkali metal salt, it may be preferable to effect such modification before the etherification rather than after it.

As acids for liberating the cellulose hydroxy fatty acid from its alkali metal salt in the etherification reaction mixture there must be used a strongly ionized acid, and common mineral acids such as sulphuric acid, nitric acid, phosphoric acid and hydrochloric acid may conveniently be used. Sulphuric acid, nitric acid and phosphoric acid are especially useful acids with which to carry out the acidification of the reaction mass since they can be obtained in desirably high concentrations in liquid form, and it will frequently be desirable to employ an acid of a normality exceeding 14 N. The exact minimum concentration depends on the composition of the unacidified reaction mixture and the properties of the salt of the cellulose hydroxy fatty acid contained therein, and is therefore liable to variation, but in the case of sulphuric acid we have found that concentrations ranging from about 60 per cent to 80 per cent are very suitable strengths for the liberating acid to be introduced into the reaction mixture for the purpose of acidifying it.

As compared with lower concentrations, the concentrations within the aforementioned range have the advantage that it is easier to prevent local loss of fibrous form in the early stages of the conversion, when the product is most liable to suffer from swelling by the water introduced with the acid, and also that a smaller consumption of the acid is required to bring the mixture to a condition of acidity sufficient to yield a cellulose hydroxy fatty acid of low water absorbency, when it is subsequently drowned. As compared with sulphuric acid concentrations above 80 per cent, this range of concentrations has also the advantage that there is less danger of causing a loss of the fibrous form of the cellulose hydroxy fatty acid once the conversion is complete, as a result of the swelling effect of any excess sulphuric acid, such swelling effect being noticeable when the purified cellulose hydroxy fatty acid is in contact with sulphuric acid of about 40 per cent concentration and upwards. In carrying out the acidification, it is necessary that the acid should be added gradually to the reaction mixture with good agitation of the contents of the vessel employed for the purpose. Incorporating machines of the Werner Pfleiderer type may conveniently be employed. Cooling is often desirable during acidification in order to minimise the loss of viscosity.

The fibrous mixture may then be diluted with water, and liquor is squeezed out from it by means of a press, centrifugal or the like, the wet residue then being mixed with more water and again squeezed to expel liquid, these operations being repeated until the undesired saline content and the acidity have been suitably minimised. If the acidification has been correctly carried out, there should be no difficulty in obtaining, after centrifuging, a wet fibrous product containing not less than 25 per cent. of its weight of dry cellulose hydroxy fatty acid.

The cellulose hydroxy fatty acid may most conveniently be dried off from water containing a proportion of a water miscible volatile organic non-solvent, for instance ethyl alcohol, methyl alcohol, or acetone.

In the preparation of the water soluble salts of the cellulose hydroxy fatty acid, the appropriate base or salt of a volatile acid capable of being displaced by the cellulose hydroxy fatty acid may conveniently be dissolved or suspended in the organic liquid, with or without the assistance of water. Sodium, potassium or lithium hydroxide, carbonates or acetates, ammonia, ammonium carbonate or ammonium acetate are examples of materials that can be used for forming the salts. By the use of a slight excess of the alkaline material and subsequent admixture of a volatile organic acid such as acetic acid it is possible to vary the extent to which the conversion of the cellulose hydroxy fatty acid into this salt is effected, and hence with the assistance of indicators to obtain products which dissolve in water to yield solutions of a desired pH within the soluble range.

Cellulose hydroxy fatty acids are moderately strong acids having dissociation constants comparable with those of acetic acid and benzoic acid and considerably higher than that of carbonic acid. When suspended in water the undissolved cellulose hydroxy fatty acids show an acid reaction, but their observed pH is higher than the pH to which it is necessary to acidify their salts in order to isolate them from the etherification reaction mixtures or precipitate them from solution. The pH at which the whole of the cellulose hydroxy fatty acid is in the form of a sodium salt is approximately 8, but there is a considerable pH range over which the material once dissolved remains in solution, namely from about 3 upwards. This property renders the material of particular value in its application as an emulsifying agent or dispersing agent, in that it is suitable for materials having themselves a wide range of pH characteristics and also serves for materials which are liable to change in pH characteristics on storage. The viscosity of solution of the soluble salts of cellulose hydroxy fatty acids depends on the pH of the solution, the maximum viscosity range being at the pH range approximately 5 to 11.

The viscosity characteristics of the soluble salts of cellulose hydroxy fatty acids are permanently reduced by exposure of their solutions or of the undissolved fibrous material to raised temperatures over a period of time, and this effect is specially noticeable at temperatures about 60° C. A permanent reduction in viscosity characteristics is also experienced if the cellulose hydroxy fatty acid is heated for a period of time. Higher viscosity products can thus be obtained when the water wet purified cellulose hydroxy fatty acid is dried off at relatively low temperatures after the water has been partly replaced by alcohol or the like than when it is dried off directly at higher temperature. In the formation of the soluble salts of the cellulose hydroxy fatty acid the employment of volatile organic liquids such as ethyl alcohol, methyl alcohol or acetone is useful not only in preserving the fibrous form of the product and in absorbing the heat of the reaction but also in reducing the temperature at which the product can be dried off, thus helping to maintain its viscosity. The water soluble salts of cellulose hydroxy fatty acids are somewhat hygroscopic and may advantageously be stored in closed vessels or in a warm dry atmosphere. They may be dissolved by soaking them in several times their weight of water and allowing the mixture to stand with occasional stirring.

The invention is further illustrated by the following examples, in which the parts are parts by weight:

Example 1

96 parts sulphite woodpulp sheet in the form of squares of ⅛" side containing 10 per cent. moisture and 82 per cent. alpha-cellulose are mechanically worked for one hour in a Werner Pfleiderer incorporating machine with a mixture of 40 parts sodium hydroxide, 40 parts water and 75 parts 95 per cent. alcohol. A solution of 58 parts sodium chloracetate in 69 parts water at a temperature of 0° C. is added to the shredded mixture, which has a temperature of about 15° C. and the machine is kept running for a further hour to mix the contents. The mixture is then transferred to loosely closed bins in a room at 27° C. The mixture commences to heat up and attains a temperature of about 60° C. in about three hours' time, but is kept for a total period of 8 hours in the warm room. The mixture is transferred to the Werner Pfleiderer incorporator, and 150 parts 65 per cent. sulphuric acid are gradually mixed with cooling while the machine is kept running over a period of 15 minutes. The mixture is mixed with 2,000 parts hot water and centrifuged, and the fibrous cake is mixed with 2,000 parts water and centrifuged again, by which operation its weight is reduced to 350 parts. After a further washing with 2000 parts water and centrifuging until its weight is reduced to about 350 to 380 parts, the cake is mechanically mixed with 50 to 60 parts methylated spirit (94 per cent. alcohol), and the mixture is pressed until it weighs 250 parts; the mixture is then opened out and dried off. The resulting cellulose glycollic acid dissolves easily in dilute ammonia or sodium hydroxide solution. Depending on the amount of the alkali employed, solutions of slightly alkaline, neutral or slightly acid character may thus be prepared.

Example 2

The preparation and purification of the cellulose glycollic acid are carried out as in Example 1, except that the wet material is not dried off. Instead, it is mechanically mixed with a solution containing 10 parts sodium hydroxide, 10 parts water and 80 parts methylated spirit for half an hour. The mixture is then rendered neutral by mixing in a small amount of acetic acid and it is pressed until it weighs about 250 parts. The pressed mass is opened up and dried off. It dissolves easily in water forming a solution of pH approximately 7.

Example 3

The process is carried out as described in Example 1, except that instead of 150 parts 65 per cent. sulphuric acid there are employed 95 parts of 75 per cent. sulphuric acid, and that after the third extraction with water the sulphate content of the centrifuged cake is estimated, and a corresponding quantity of sodium acetate is dissolved in the methylated spirits subsequently added.

Example 4

An ammonium salt of cellulose glycollic acid is prepared according to the process employed for the preparation of the sodium salt in Example 2, except that instead of the solution containing sodium hydroxide, water and methylated spirits there is added first 100 parts alcohol and thereafter 30 parts 30 per cent. aqueous ammonia, the treatment with acetic acid being omitted. The material dried at a temperature below 60° C. dissolves easily in water.

Example 5

96 parts sulphite woodpulp sheet in the form of squares of ⅛" side containing 10 per cent. moisture, 82 per cent. alpha-cellulose are mechanically mixed for one hour in a Werner Pfleiderer incorporating machine with a mixture of 35 parts sodium hydroxide, 20 parts water and 75 parts 95 per cent. alcohol solution made up at 0° C. by dissolving 37 parts chloracetic acid in a solution of 15 parts sodium hydroxide in 45 parts water is then added to the shredded mixture which has a temperature of about 15° C. and the machine is kept running for a further hour to mix the contents. The mixture is then transferred to loosely closed bins in a room at 27° C. in which it is kept for a total period of 8 hours in the warm room. The mixture is then transferred to a Werner Pfleiderer incorporator, and 110 parts 55 per cent. sulphuric acid are gradually mixed in with cooling while the machine is kept running over a period of fifteen minutes. The further purification and isolation of the cellulose glycollic acid are then carried out as described in Example 1.

As many apparently widely different embodiments of the invention will be apparent without departing from the spirit and scope thereof, it must be understood that the invention is not limited to any specific embodiment except as defined in the appended claims.

We claim:

1. A process for isolating a water-insoluble cellulose glycollic acid from an etherification reaction mixture containing a fibrous water-soluble alkali metal salt of said cellulose hydroxy fatty acid, which comprises gradually adding thereto a strongly ionized acid having a normality exceeding 14 in such amounts that the fibrous condition of said cellulose hydroxy fatty acid is retained throughout said addition and thereafter extracting said water-insoluble product with water.

2. A process for isolating a water-insoluble cellulose glycollic acid from an etherification reaction mixture containing a fibrous water-soluble alkali metal salt of said cellulose hydroxy fatty acid, which reaction mixture contains a non-solvent water miscible organic liquid, which comprises gradually adding thereto a strongly ionized acid having a normality exceeding 14 in such amounts that the fibrous condition of said cellulose hydroxy fatty acid is retained throughout said addition and thereafter extracting said water-insoluble product with water.

3. A process for isolating a water-insoluble cellulose glycollic acid from an etherification reaction mixture containing a fibrous water-soluble alkali metal salt of said cellulose hydroxy fatty acid, which reaction mixture contains a non-solvent water miscible organic liquid, which comprises gradually adding thereto sulfuric acid having a normality exceeding 14 in such amounts that the fibrous condition of said cellulose hydroxy fatty acid is retained throughout said addition, and thereafter extracting said water-insoluble product with water.

4. A process for isolating a water-insoluble cellulose glycollic acid from an etherification reaction mixture containing a fibrous water-soluble alkali metal salt of said cellulose hydroxy fatty acid, which reaction mixture contains a non-solvent water miscible organic liquid, which comprises gradually adding thereto sulfuric acid of a concentration between 60 and 80 per cent in such amounts that the fibrous condition of said cellulose hydroxy fatty acid is retained throughout said addition, and thereafter extracting said water-insoluble product with water.

5. A process for the production of a water-soluble salt of a water-insoluble cellulose hydroxy fatty acid, produced in accordance with the process of claim 1, which comprises treating said water-insoluble acid with a base in the presence of a volatile organic water miscible liquid inert with respect to the cellulose glycollic acid.

6. A process for the production of a water-soluble salt of a water-insoluble cellulose glycollic acid, produced in accordance with the process of claim 2, which comprises treating said water-insoluble acid with an alkali metal base in the presence of a water miscible alcohol.

7. A process for the production of a water-soluble salt of a water-insoluble cellulose glycollic acid, produced in accordance with the process of claim 2, which comprises treating said water-insoluble acid with an alkali metal base in the presence of a water miscible alcohol and drying the resulting fibrous product at a temperature not exceeding 60° C.

ALBERT A. HOUGHTON.
KENNETH J. C. LUCKHURST.